J. N. EVANS.
COLLAPSIBLE TOWER.
APPLICATION FILED AUG. 2, 1915.

1,284,078.

Patented Nov. 5, 1918.
2 SHEETS—SHEET 1.

Witnesses

Inventor
J. N. Evans
By Victor J. Evans
Attorney

J. N. EVANS.
COLLAPSIBLE TOWER.
APPLICATION FILED AUG. 2, 1915.
1,284,078.
Patented Nov. 5, 1918.
2 SHEETS—SHEET 2.
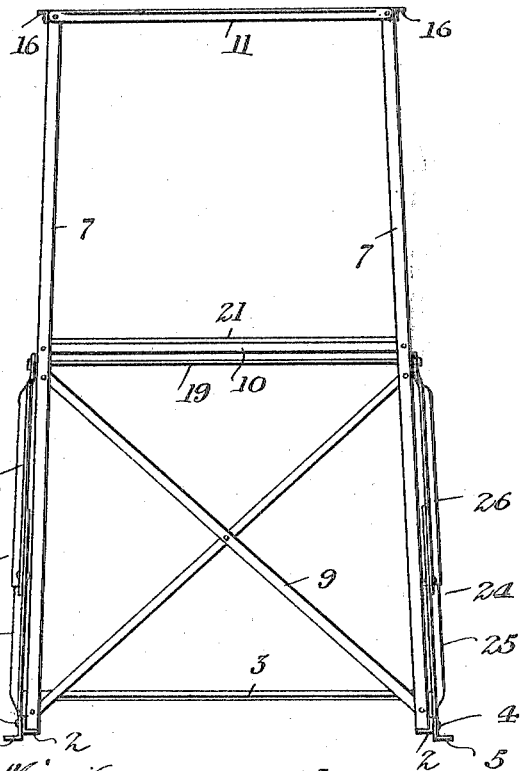
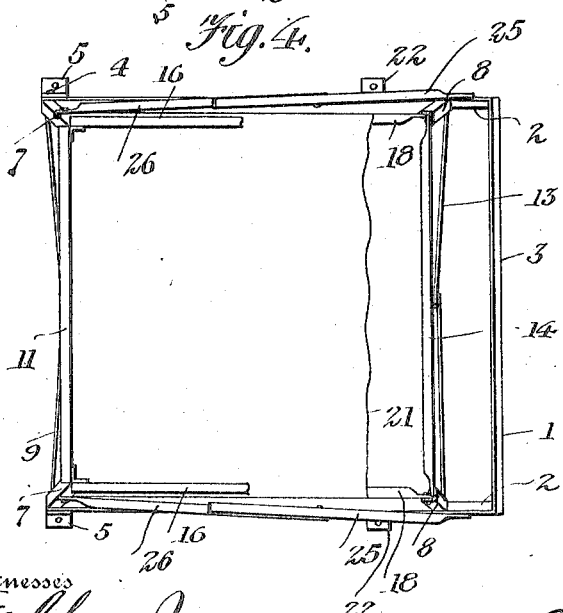
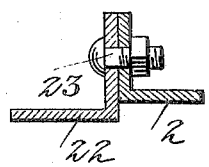
Witnesses
Ho. Ackman Jr.
J. W. Garner
Inventor
J. N. Evans
By Victor J. Evans
Attorney

UNITED STATES PATENT OFFICE.

JOSEPH N. EVANS, OF WILSON, NEW YORK.

COLLAPSIBLE TOWER.

1,284,078.  Specification of Letters Patent.  Patented Nov. 5, 1918.

Application filed August 2, 1915. Serial No. 43,240.

*To all whom it may concern:*

Be it known that I, JOSEPH N. EVANS, a citizen of the United States, residing at Wilson, in the county of Niagara and State of New York, have invented new and useful Improvements in Collapsible Towers, of which the following is a specification.

This invention is an improved collapsible tower especially adapted for use to support a workman in an elevated position when performing such work as spraying or pruning trees or the like, and for use especially in connection with a spray rig, the object of the invention being to provide an improved tower of this class, which is light, cheap, simple, strong and durable, which may be readily raised for use and as readily folded or collapsed when not in use, and which when raised is strong and rigid.

The invention consists in the construction, combination and arrangement of devices hereinafter described and claimed.

In the accompanying drawings:—

Fig. 3 is a rear elevation of the tower raised.

Fig. 4 is partly a plan and partly a horizontal sectional view of the same.

Fig. 5 is a detail vertical sectional view.

Figure 1:
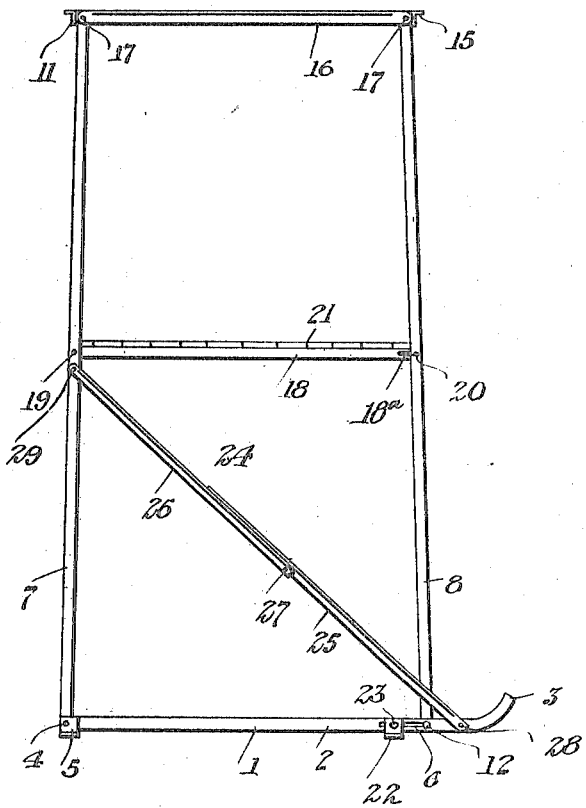
Figure 1 is a side elevation of a tower constructed in accordance with my invention showing the same in raised position.

In accordance with my invention I provide a bottom frame 1 which is here shown as substantially U-shaped, comprising a pair of parallel arms 2 and a connecting portion which forms a handle 3. The arms, at their rear ends, are pivotally mounted as at 4 on angle brackets 5 which are adapted to be secured on the upper side of a suitable supporting object, such for instance as a spray tank. The said arms 2 of the bottom frame are each provided at a suitable distance from the front end with a slot 6.

I also provide a pair of rear standards 7 and a pair of front standards 8. Said standards diverge downwardly. The standards 7 have their lower ends pivotally connected to the bottom frame 1 by the same pivots 4 which pivotally connect the said bottom frame to the angle brackets 5 and the lower portions of said standards 7 are connected together by crossed braces 9. Said standards are also connected together by a horizontally arranged brace or bar 10 at an intermediate point, their upper ends being connected together by a bar 11.

The lower ends of the front standards 8 are pivotally connected to the arms 2 of the bottom frame 1 by pins or bolts 12 which operate in the slots 6. These standards have their lower portions connected together by crossed braces 13 and they are also connected together, at an intermediate point by a cross brace 14, their upper ends being connected together by a bar 15. The upper ends of the standards 7 and 8 are connected by bars 16 the ends of which are pivotally connected to said standards as at 17. The bars 11, 15 and 16 form a top rail. The standards 7, 8 are also connected together at a point intermediate their ends by side bars 18 which are pivotally attached thereto as at 19, 20. A platform 21 is supported on the bars 10, 14 and 18. The operator who uses the tower when the latter is in set up position stands on the platform 21 and is protected by the railing 11, 15, 16 as will be understood.

Clips 22 are also provided which are secured at suitable points on the spray tank top or other support of the tower and pins or bolts 23 are provided which are adapted to pass through openings in said clips and to be inserted in the slots 6 of the arms 2 of the bottom frame, the bottom frame being thus held on the spray tank top in horizontal position and being adapted to be tilted or inclined if desired after the pins or bolts 23 have been removed. The slots 6 permit adjustment of the clips 22 on the tank as may be required.

I also provide a pair of braces 24 each of which comprises a pair of members 25, 26 connected together by a rule joint 27, the lower end or member 25 being pivotally connected to one side of the bottom frame, at the front, as at 28 and the upper end of each member 26 being pivotally connected to one of the rear standards 7 by the pivot rod 29 as shown.

Figure 2:
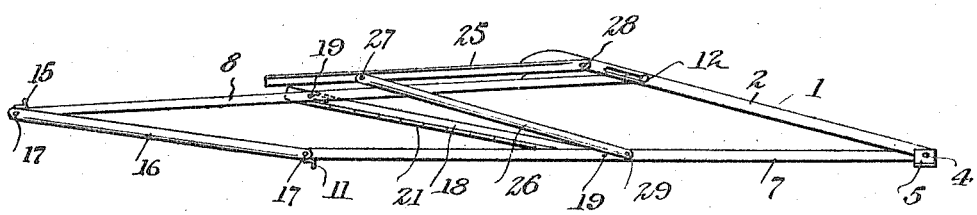
Fig. 2 is a similar view of the tower in folded or collapsed position.

The rule joint braces are in extended position when the tower is set up and serve to rigidly brace the tower and hold it in upright position. When it is desired to collapse the tower, this may be done by turning the bottom frame upwardly on the pivots 5 as shown in Fig. 2, after having first removed the bolts 23 to disconnect the bottom frame from the clips 22. The slots 6 and like slots 18$^a$ in 18 permit sufficient sliding movement of the pivots 12 and 20, to allow the standards 7 and 8 to come near enough to parallel to allow at least a reasonable collapsing of the tower by folding 8 down toward 7, and the braces 24 bend and permit this collapsing of the tower as shown.

Having thus described my invention I claim:—

A collapsing tower of the class described comprising a bottom frame having side members provided with longitudinal slots near their front ends and a transverse member connecting the front ends of the side members, supports for the rear end of the bottom frame and on which the same is pivotally mounted, clips, bolts detachably connecting the clips to the bottom frame and arranged in said slots and permitting adjustment of the clips, rear standards having their lower ends pivotally connected to the bottom frame by the same pivots which connect the bottom frame to said supports, front standards having pivots at their lower ends arranged for movement in said slots, a platform connecting and pivotally attached to the front and rear standards, and foldable braces having their front ends pivotally connected to the bottom frame and their rear ends pivotally connected to the rear standards.

In testimony whereof I affix my signature in presence of two witnesses.

JOSEPH N. EVANS.

Witnesses:
ALBERT N. DOBBS,
ARTHUR M. DOBBS.

Copies of this patent may be obtained for five cents each, by addressing the "Commissioner of Patents, Washington, D. C."